Feb. 9, 1926.
B. P. JOYCE
1,572,537
LUBRICATING DEVICE
Filed May 7, 1923
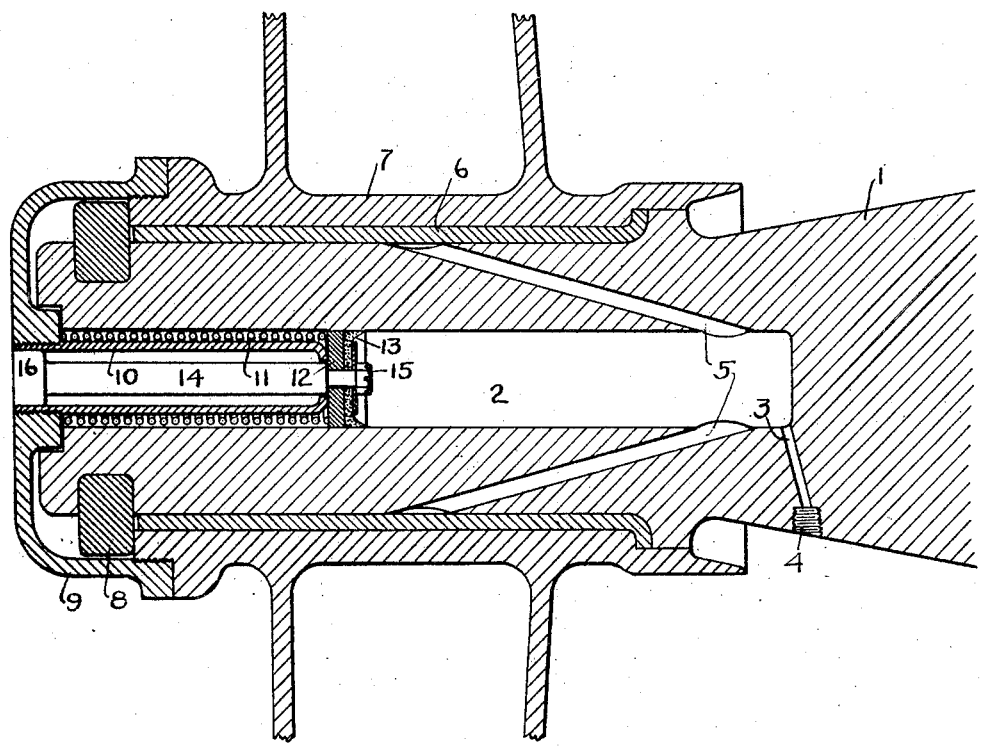
Inventor
BRYAN P. JOYCE.
By W. N. Roach
Attorney

UNITED STATES PATENT OFFICE.

BRYAN P. JOYCE, OF DAVENPORT, IOWA, ASSIGNOR TO THOMAS A. CONLON, OF SILVER SPRING, MARYLAND.

LUBRICATING DEVICE.

Application filed May 7, 1923. Serial No. 637,241.

(GRANTED UNDER THE ACT OF MARCH 3, 1883; 22 STAT. L. 625.)

*To all whom it may concern:*

Be it known that I, BRYAN P. JOYCE, a citizen of the United States, and a resident of Davenport, county of Scott, and State of Iowa, have invented an Improvement in Lubricating Devices, of which the following is a specification.

The invention described herein may be used by the Government, or any of its officers or employees in prosecution of work for the Government, or by any other person in the United States, without payment to me of any royalty thereon, in accordance with the act of March 3, 1883.

The subject of this invention is a lubricating device intended, primarily, for lubricating artillery vehicle wheels.

The main object of my invention is the provisions of a simple and efficient means for automatically feeding lubricant to the axle of a vehicle.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of my invention is illustrated in the accompanying drawing wherein the figure is a longitudinal sectional view of a fragment of a vehicle axle and wheel.

Referring to the drawing by numerals of reference:

In carrying out my invention I provide an axle 1 in which is formed a chamber 2 extending preferably axially of the axle for a short distance. From the recess 2 a duct 3 leads to the outside of the axle, which duct may conveniently terminate in an enlarged recess 4 which may be threaded to receive a closure plug, not shown, or the end of a grease gun through which lubricant may be forced into the chamber 2. Also leading from the chamber 2 to that portion of the axle upon which the wheel hub is mounted are ducts 5 through which lubricant is conveyed to the bushing 6 of the hub 7.

The hub 7 may be locked in place on the axle by means of a ring 8 which is seated in an annular groove formed adjacent the end of the axle. A hub cap 9 is threaded on the outer end of the hub and the cap is provided with a central threaded aperture in which is secured a tube 10 which extends into the recess 2 and the inner end of which is upset inwardly to provide an apertured head. Surrounding the tube 10 is a coil spring 11 one end of which rests against the hub cap while the inner end contacts a disk 12 which forms a backing or support for a washer 13, both held on the end of a plunger 14 by means of a nut 15. The plunger 14 is reciprocable within the tube 10 passing through the apertured head thereof and has formed on its other end a head 16 which has a close sliding fit in the tube.

As will be readily understood, when lubricant is forced through a duct 3 into the recess 2 it will force the washer 13 and plunger 14 outwardly against the force of the spring 11. As the lubricant is consumed through rotation of the wheel the spring 11 will force the washer 13 inwardly thereby forcing lubricant through the ducts 5 to linings or bushing of the hub thereby properly lubricating the same.

I claim:

A lubricating device embodying an axle provided with a chamber and with ducts leading to said chamber, a hub mounted on the axle, one of said ducts opening beyond the hub to provide means for supplying lubricant to the chamber, a ring seated in an annular groove formed in the axle for locking the hub on the axle, a hub cap secured to the hub, a tube carried by the hub cap and extending into the chamber, a washer within the chamber, a plunger within the tube and secured to the washer and a spring surrounding the tube and tending to force the washer forwardly within the chamber.

BRYAN P. JOYCE.